United States Patent [19]
Kotani et al.

[11] Patent Number: 4,809,080
[45] Date of Patent: Feb. 28, 1989

[54] READ/RECORD HEAD IN FACSIMILE

[75] Inventors: Matahira Kotani, Nara; Hiroshi Morimoto, Sakurai; Ryoichi Kawai, Nara; Kenichi Shiraishi, Yamatokoriyama, all of Japan

[73] Assignee: Sharp Kabushiki Kaisha, Osaka, Japan

[21] Appl. No.: 944,211

[22] Filed: Dec. 22, 1986

[30] Foreign Application Priority Data

Dec. 23, 1985 [JP] Japan .................. 60-289818

[51] Int. Cl.$^4$ .................................. H04N 1/42
[52] U.S. Cl. .................... 358/256; 358/285; 358/293
[58] Field of Search ............ 358/256, 286, 285, 293, 358/294, 296; 382/59

[56] References Cited

U.S. PATENT DOCUMENTS

| | | | |
|---|---|---|---|
| 3,749,833 | 7/1973 | Rait | 358/294 |
| 3,800,076 | 3/1974 | Koizumi | |
| 4,574,317 | 3/1986 | Scheible | 358/293 |
| 4,652,743 | 3/1987 | Harano | 358/293 |

FOREIGN PATENT DOCUMENTS

| | | |
|---|---|---|
| 0039170 | 4/1981 | European Pat. Off. . |
| 0076700 | 10/1982 | European Pat. Off. . |
| 0098745 | 6/1983 | European Pat. Off. . |
| 2716976 | 4/1977 | Fed. Rep. of Germany . |
| 3033520 | 9/1980 | Fed. Rep. of Germany . |
| 3339256 | 10/1983 | Fed. Rep. of Germany . |
| 34273 | 4/1981 | Japan .................. 358/294 |
| 1557881 | 6/1977 | United Kingdom . |
| 2010633 | 12/1978 | United Kingdom . |
| 2015846 | 2/1979 | United Kingdom . |
| 2069291 | 2/1981 | United Kingdom . |
| 2082874 | 8/1981 | United Kingdom . |

OTHER PUBLICATIONS

Scanning Typewriter, by Dattilo and Queener, IBM Technical Disclosure Bulletin, vol. 20, No. 4, Sep. 1977, p. 1299.

*Primary Examiner*—Tommy P. Chin
*Attorney, Agent, or Firm*—Birch, Stewart, Kolasch & Birch

[57] ABSTRACT

A facsimile apparatus in which a read head for reading information to be transmitted from a paper surface and a record head for recording received information on a paper surface are constructed integral with each other.

3 Claims, 1 Drawing Sheet

READ/RECORD HEAD IN FACSIMILE

BACKGROUND AND SUMMARY OF THE INVENTION

The present invention relates to an improvement in a facsimile apparatus.

Recently, efforts have been made in the miniaturization of and reduction in price of the facsimile apparatus.

In the conventional facsimile apparatus, a read head for reading information to be transmitted from a paper surface and a record head for recording the received information on a paper surface are individually disposed within the apparatus. Therefore, this inhibits attempts towards the miniaturization of the facsimile apparatus, since many parts are used, resulting in a limitation of a reduction in cost.

The facsimile apparatus according to the present invention is characterized in that a read head for reading information to be transmitted from a paper surface and a record head for recording a received information on the paper surface are made integral with each other.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
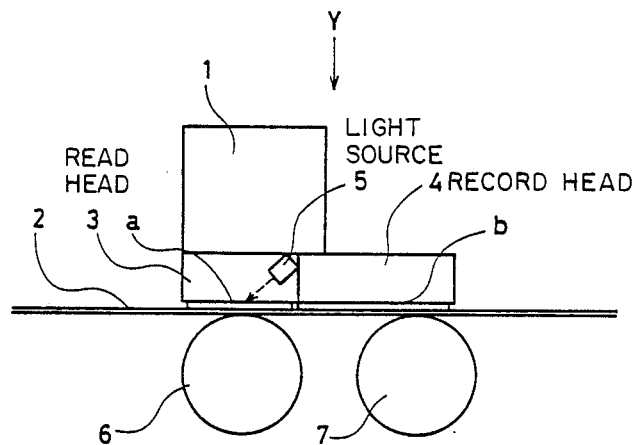
FIG. 1 is a sectional view showing a schematic construction of the embodiment according to the present invention.
Figure 2:
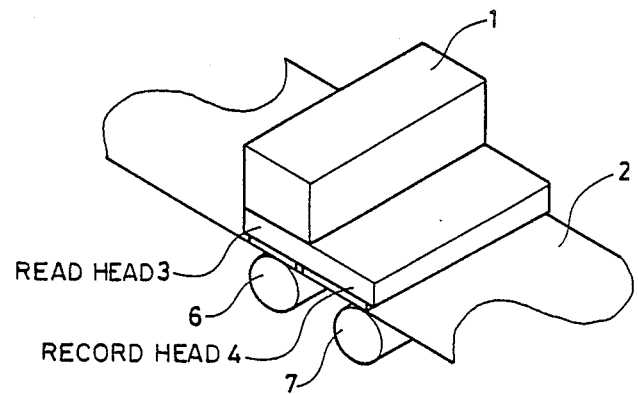
FIG. 2 is a perspective view showing a schematic external appearance of the embodiment according to the present invention.

FIG. 1 shows a schematic construction of an embodiment according to the present invention, and FIG. 2 shows a schematic external appearance of the embodiment according to the present invention. A read/record head 1 is integrally formed with a read head 3 for reading information to be transmitted from an original or a paper surface 2 as a sheet of recording, and a record head 4 for recording the received information on the paper surface 2. The read head 3 and the record head 4 may be coplanar. The read head 3 comprises a contact sensor using, for example, a rod lens array. The record head 4 comprises for example a thermal head. On the read head 3 is disposed a light source 5 for applying an illumination to the paper surface 2 at a read position a. When the read/record head 1 is urged in a direction as indicated at arrow Y, the read position a and a record position b of the record head 4 are brought into pressure contact with platen rollers 6 and 7. These platen rollers 6 and 7 may be rotated clockwise and counterclockwise.

Operation of the apparatus will be described hereinafter.

During transmission, an original 2 is fed under pressure by the platen rollers 6 and 7 and forces exerted towards the read position a and record position b of the read/record head 1, wherein the original 2 receives an illumination from the light source 5 at the read position a. A reflected image is focused at the read head 3 and converted into an electric signal.

During receiving, the record sheet 2 is fed in a state wherein the sheet 2 is brought into pressure contact with the read/record head 1 by the platen rollers 6 and 7 in a manner similar to that as described above, and received information is recorded by the record head 4 on the record sheet 2 at the record position b.

The platen rollers 6 and 7 may be independently rotated clockwise and counterclockwise. Thus, by driving the platen rollers individually or simultaneously, a plurality of originals or standard-length record sheets may be fed without difficulty. Moreover, the sheet may be fed leftward or rightward, and therefore, in the case where for example the received information is recorded on a record sheet 2 and the sheet is cut, if the distance from the cut position to the position at which the next recording starts is great, the record sheet 2 is brought back to reduce the distance from the cut position to the position at which recording starts, thus avoiding waste.

As described above, according to the present invention, since the read head and the record head are made integral with each other, it is possible to miniaturize the facsimile apparatus and to reduce cost due to the reduction in the number of parts.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A facsimile apparatus which comprises:
    a read head for reading information which is to be transmitted from an original paper surface;
    a record head for recording received information on a recording paper surface, wherein said read head and said record head are constructed to be integral with each other, and are oriented so that said heads read and record from the same planar surface;
    a first roller rotatably mounted on the opposite side of said planar surface from said read head for being brought into pressure contact through said original paper surface with said read head, and
    a second roller rotatably mounted on the opposite side of said planar surface from said record head for being brought into pressure contact through said recording paper surface with said record head, wherein said rollers are independently rotatable in both forward and backward directions, and wherein said rollers rotate individually and simultaneously so that said heads can receive a plurality of original papers and recording papers.

2. The facsimile apparatus according to claim 1, further comprising a read/record head operatively associated with said read head and said record head.

3. The facsimile apparatus according to claim 2, wherein said read head comprises a contact sensor and a rod lens array, and wherein said record head comprises a thermal head.

* * * * *